United States Patent [19]
Burk et al.

[11] Patent Number: 5,560,214
[45] Date of Patent: Oct. 1, 1996

[54] CONDENSER FOR AN AIR-CONDITIONING SYSTEM OF A VEHICLE

[75] Inventors: Roland Burk, Kornwestheim; Karl Lochmahr, Vaihingen; Manfred Nonnenmann, Schwieberdingen; Werner Rojnica, Esslingen, all of Germany

[73] Assignee: Behr GmbH & Co., Stuttgart, Germany

[21] Appl. No.: 274,411

[22] Filed: Jul. 13, 1994

[30] Foreign Application Priority Data

Jul. 15, 1993 [DE] Germany .................. 43 23 740.1
Mar. 30, 1994 [DE] Germany .................. 44 10 986.5

[51] Int. Cl.⁶ ............................................. F25B 49/02
[52] U.S. Cl. ........................................ 62/129; 62/218
[58] Field of Search ............................ 62/126, 129, 218; 165/11.1, 13

[56] References Cited

U.S. PATENT DOCUMENTS

| | | | |
|---|---|---|---|
| 2,165,569 | 7/1939 | Obermaier | 62/129 |
| 2,705,405 | 4/1955 | Uhlman . | |
| 3,410,102 | 11/1968 | Karsten | 62/129 |
| 4,178,769 | 12/1979 | Johnsen | 62/218 X |
| 5,076,066 | 12/1991 | Bottum | 62/126 |
| 5,209,077 | 5/1993 | Manz | 62/149 |
| 5,228,304 | 7/1993 | Ryan | 62/129 |

FOREIGN PATENT DOCUMENTS

| | | |
|---|---|---|
| 0480330 | 4/1992 | European Pat. Off. . |
| 1932649 | 11/1965 | Germany . |
| 717506 | 2/1980 | U.S.S.R. .................. 165/13 |

OTHER PUBLICATIONS

Patent Abstracts of Japan, M-1071 Jan. 21, 1991, vol. 15/No. 25.

*Primary Examiner*—William E. Tapolcai
*Attorney, Agent, or Firm*—Evenson McKeown Edwards & Lenahan, PLLC

[57] ABSTRACT

A condenser that is a block of tubes and ribs with lateral collecting tubes, is provided with a tube-shaped collector in parallel to one of these collecting tubes and forms a unit with it, at least one float being arranged in this tube-shaped collector. The at least one float carries a transmitter element to which a receiver element is assigned which is arranged on the outside on the collector and receives signals through a wall of the collector.

25 Claims, 3 Drawing Sheets

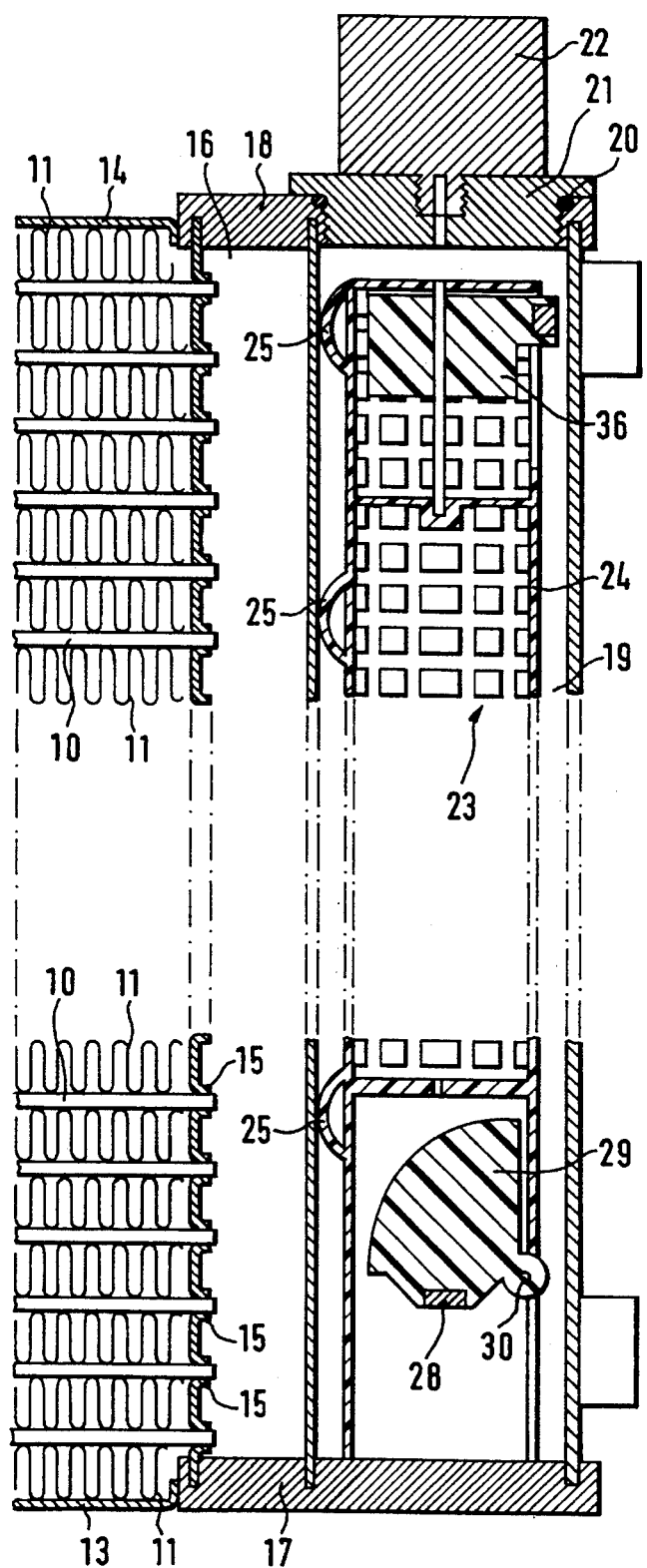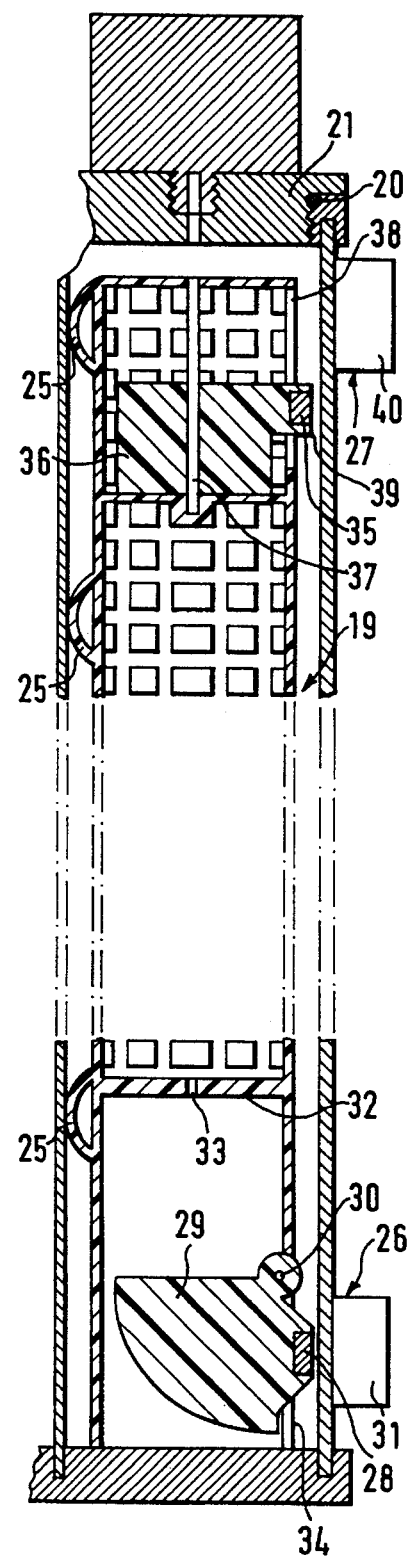

5,560,214

CONDENSER FOR AN AIR-CONDITIONING SYSTEM OF A VEHICLE

BACKGROUND AND SUMMARY OF THE INVENTION

The present invention relates to a condenser for an air-conditioning system of a vehicle and comprises a block of tubes and ribs which is provided with collecting tubes on both sides, a tube-shaped collector being arranged in parallel to one collecting tube and forming a unit with this collecting tube.

A condenser of the above described type is shown in European Patent Document EP 0 480 330 A2.

An object of the present invention is to provide a condenser of the above-described type in which it is possible to monitor the operation of the air-conditioning system without the requirement of additional connections which harbor the risk of leakages.

This and other objects are achieved in that at least one float is arranged in the collector which carries a transmitter element to which a receiver element is assigned which is arranged on the outside on the collecting tube and receives signals of the transmitter element through a wall of the collector.

By means of the present invention, it is possible to obtain and analyze, during filling, a signal indicating the correct filling or, during operation, a signal indicating the minimum amount of refrigerant, without the requirement of a connection which penetrates into the refrigerant circulating system. By avoiding such an additional connection, the danger is eliminated that this connection may leak and result in a loss of refrigerant.

In certain embodiments of the invention, two floats are arranged in the collector, of which an upper float is assigned to a filling detector and a lower float is assigned to a detector which responds when there is a falling-below a minimal filling. When the air-conditioning system is being filled with refrigerant, for example, the filling detector will emit a signal to a filling apparatus which indicates the correct filling amount and terminates the filling operation. The detector responding to the minimal filling emits, for example, a signal to a display device on the dashboard of a vehicle so that the operator of the air-conditioning system is made aware of the fact that the air-conditioning system is in need of servicing.

In a further development of the invention, the lower and/or upper float is arranged in a calm-flow area of the collector. This ensures that refrigerant flows have no influence on the position of this float so that no erroneous signal emission has to be feared which is caused by different flow velocities of the refrigerant.

In an embodiment of the invention, it is provided that the at least one float is displaceable on a slideway. In another embodiment, it is provided that the at least one float is disposed to be swivellable about a swivel axis. This type of bearing of the float has the advantage that, particularly in the response area of the detector or detectors, even short paths of the float and therefore small changes of the liquid level result in clear differences in the respective emitted signals.

In another embodiment, the receiver element is mounted on a cover or on the bottom of the collector. In an advantageous development of this embodiment, it is provided that the cover and/or the bottom of the collector is provided with a tube-shaped projection which is closed on one side, which projects into the interior of the collector and in which a receiver element is arranged. Also in this embodiment, the receiver element is arranged on the outside on the collector. Also in this case, the receiver element receives signals through the wall of the collector, specifically through the cover or the bottom. In this embodiment, the receiver element is arranged in a well-protected manner inside the cover or the bottom. A securing with respect to a torsion insert is not required for the dryer. In an advantageous further development of this embodiment, the float is guided on the projection of the cover or of the bottom.

Certain embodiments of the invention provide that the at least one float is disposed on a housing of a dryer which can be inserted into the collector which is provided with an insertion opening that can be closed by a detachable cover. Advantageously, the condenser proper is a soldered construction whose soldering takes place at a high temperature in a furnace. By arranging the float or the floats on the housing of a dryer which can be inserted subsequently, it is avoided that the float and/or its transmitter element and/or its bearing or guide is subjected to the high soldering temperatures which may result in damage or disturbances.

In further embodiments of the invention, at least one float is provided with a permanent magnet which serves as the transmitter element and to which a Hall effect element or a Reed switch is assigned as the receiving element which is arranged on the exterior side of the collector. In both embodiments, the signal is clearly and reliably transmitted through the closed wall of the collector without the necessity of providing an opening or the like for this purpose.

In still further embodiments of the invention, the transmitter element and the receiver element are arranged such that a contact is closed when refrigerant is absent. This makes it possible to carry out a test after assembly, while the refrigerant has not yet been filled in, by which it is determined whether a float is installed which has a transmitter element and whether there is operatability.

Other objects, advantages and novel features of the present invention will become apparent from the following detailed description of the invention when considered in conjunction with the accompanying drawings.

BRIEF DESCRIPTION OF THE DRAWINGS

FIG. 1 is a partial sectional view of a condenser constructed according to an embodiment of the present invention which is equipped with two level sensors.

FIG. 2 is a sectional view only through the area of a collector of the condenser with detectors which are each in the opposite end position.

DETAILED DESCRIPTION OF THE DRAWINGS

Figure 3:
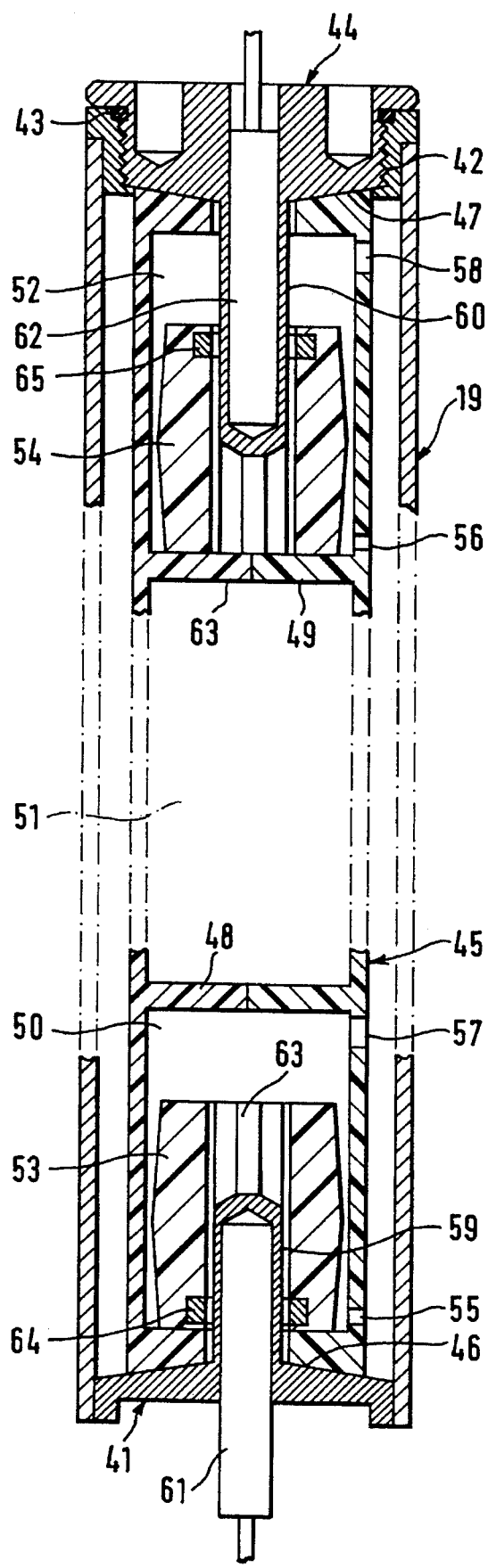
FIG. 3 is a sectional view of the collector of another embodiment of the present invention.

The condenser which is partially illustrated in FIG. 1 has a block of tubes and ribs made of flat tubes 10 between which corrugated ribs 11 are arranged. The respective last corrugated ribs 11 are covered on the top and on the bottom by cover plates 13, 14. The two ends of the flat tubes 10 are inserted into rim holes 15 of collecting tubes 16 arranged on both sides, of which only one is illustrated in FIG. 1. The collecting tubes 16 are made of sheet metal profiles which are closed off on the top and on the bottom by an end plate 17, 18.

In parallel to the collecting tube 16, a collector 19 is arranged which forms a unit with the collecting tube 16. The collector 19 is closed off on its ends by the same end plates 17, 18. In a manner which is not shown in detail, but known to those of ordinary skill in the art, the collecting tubes 16 are provided with transverse walls in order to obtain a meandering passage of the refrigerant. Furthermore, connecting openings, which are not shown, are provided between the collecting tube 16 and the collector 19 so that the refrigerant arrives in the area of the collector 19. For example, the connecting openings may be arranged as described in German Patent Application P 42 38 853.8 which is not a prior publication. In addition, the constructions described there may also be provided for the collecting tube 16 and the collector 19.

The upper end plate 18 is provided with a detachable cover 21 which can be screwed into an internal-thread with the interposition of a seal 20. In the illustrated embodiment, a pressure transducer 22, which is open in the direction to the collector 19, is screwed into the cover 21.

A dryer insert 23 is inserted into the collector 19 which in principle is constructed as disclosed in German Patent Application P 43 19 293.9 which is not a prior publication. This dryer insert 23 is inserted into the condenser after the condenser was soldered together in the furnace. Thus, the dryer insert 23, which is inserted after the removal of the cover 21, is not subjected to the high soldering temperatures.

The dryer insert 23 has a cage-type housing 24 made of plastic or aluminum in which a dryer material is arranged inside a small bag which is permeable to the refrigerant. The dryer material and the small bag are not shown. On its circumference, the housing 24 is provided with molded-on spring clips 25 which are supported against the interior wall of the collector 19 so that the housing 24 is centered in the collector 19. Furthermore, the housing 24 is fixed in the collector 19 in the axial direction. This may take place because of the fact that the lower end of the housing 24 engages by means of detent noses in corresponding recesses of the lower end cover 17. In another embodiment, spring elements are arranged between the cover 21 and the upper end of the housing 24 which fix the housing 24 in the illustrated position.

The collector 19 is equipped with two detectors 26, 27 which detect the refrigerant level without the requirement of a connection which leads into the refrigerant circulating system. On the contrary, the detectors 26, 27 are constructed such that a signal is emitted through the closed wall of the collector 19 without the necessity of providing an opening or the like for this purpose.

The detector 26, which is arranged in the area of the lower end of the collector 19, makes it possible to display when the minimal amount of refrigerant is reached or when there is a falling-below the minimal amount of refrigerant. The detector 26 is connected to a display device which is arranged, for example, in the area of the dashboard of a motor vehicle. The detector 27 is used for monitoring the correct filling of the air-conditioning system with refrigerant. In the illustrated embodiment, it is arranged in the area of the upper end of the collector 19. In this case, it is assumed that, when the collector 19 is completely filled with refrigerant, the correct refrigerant filling will exist. Naturally, when, in the case of a correct filling, the refrigerant level is situated at a lower point, it is also possible to arrange the detector 27 in other areas of the collector 19. It may then be necessary to subdivide the dryer unit so that the dryer material is situated above and below the detector 27 in the housing 24. The detector 27 generates a signal which is emitted to a filling apparatus. By means of this signal, the filling process is terminated.

The detector 26 has a transmitter element 28 which is arranged in the collector 19 and which is carried by a float 29. The float 29 is disposed in the housing 24 so that it can be swivelled about a horizontal shaft 30. A receiver element 31 is assigned to the transmitter element 28 and is arranged on the exterior side of the collector 19. A permanent magnet, for example, is used as the transmitter element 28. A Hall-effect element or a Reed switch is provided as the receiver element 31.

The float 29 is arranged in a calm-flow area so that the flows of the refrigerant have no influence on the position of the float 29. For this purpose, a chamber is partitioned off in the lower area of the housing 24 by means of a transverse wall 32. Via a throttling port 33 of the transverse wall 32 and a slot 34 in the area of the shaft 30 of the float 29, this chamber is open in the direction of the collector 19. Since turbulences occur in the whole collector 19, a calm-flow space for an upper float 36 is also provided in certain embodiments of the present invention.

The detector 27 comprises a transmitter element 35 which is arranged in the collecting tube 19 and which is carried by the upper float 36 which is guided on a guide rod 37 arranged in the housing 24. The upper float 36 is provided with a nose 39 guided in a slot 38 of the housing 24, this nose 39 carrying the transmitter element 35. A receiver element 40 is assigned to the transmitter element 35 and is arranged on the exterior side of the collector 19. Also in the case of this detector 27, the transmitter element 35 is a permanent magnet, while the receiver element 40 is a Hall effect element or a Reed switch.

In the illustrated embodiment, the two floats 29, 36, together with the dryer insert 23, form a constructional unit. Since, as a rule, the dryer material must be replaced after approximately two years, it is expedient to construct this dryer insert 23 such that the dryer material can be exchanged without the requirement of also having to exchange the floats 29, 36. This may, for example, take place by constructing the float 36 with its guide rod 37 as a constructional unit which is fastened to the housing 24 in the manner of a cover. In this case, after the removal of this cover-type constructional unit, the dryer material can be removed and replaced in a simple manner. However, if the housing 24 together with the dryer material is to form an exchangeable dryer cartridge or the like, it is expedient to keep the floats 29 and 36 independent of the housing 24; that is, to provide separating lines inside the housing 24 between the areas of the two floats 29, 36 and the remaining portion of the housing 24.

In the illustrated embodiment, a float 36 guided on a rod 37 is assigned to the upper detector 27 and a swivellable float 29 is assigned to the lower detector 26. In certain embodiments, two identical floats are provided for the upper detector 27 as well as for the lower detector 26; that is, two swivellable or two displaceable floats. The swivellable float 29 has the advantage that, even in the case of small changes of the filling level, a clearer signal is generated between the transmitter element 28 and the receiver element 31.

In practice, the floats 29, 36 must be able to withstand temperatures of up to approximately 90° C. and pressures of up to approximately 30 bar.

Suitable floats 29, 36 may therefore be constructed as hollow metallic bodies, in which case an approximate ball shape will then expediently be provided. However, it is also possible to provide floats 29, 36 made of a massive material, in which case a material must be selected whose specific weight is lower than the specific weight of the refrigerant, and which withstands the indicated temperature conditions and pressure conditions. A suitable material, for example, is foamed polypropylene which has a density of 0.45 g/cm$^3$.

The collector 19 of the embodiment according to FIG. 3, which forms a unit with a collecting tube of a condenser in a manner not shown in detail, has a soldered-in bottom 41 and has on its upper end a soldered-in insert 42. The insert 42 is provided with an internal thread into which a cover 44 is screwed by means of inserting a packing ring 43. The bottom 41 and the cover 44 each have truncated-cone-shaped surfaces which face one another on the interior side and between which a housing 45 is clamped in which has faces 46, 47 which are recessed in a correspondingly truncated-cone-shaped manner. The housing 45 is divided in the axial direction and is joined together from two mutually supplementing half-shells. By means of the two face walls 46, 47 and transverse walls 48, 49, the housing 45 forms a total of three chambers 50, 51, 52. The center chamber 51, which is provided with perforated walls, is used for receiving a dryer material which is housed, for example, in a small bag which is permeable for a refrigerant. The lower chamber 50 and the upper chamber 52 are each used for receiving a float 53, 54. Via a respective lower opening 55, 56 and upper opening 57, 58, the lower chamber 50 and the upper chamber 52 are open in the direction of the interior of the collector 19 and via its connecting openings in the direction of the collecting tube.

The bottom 41 and the cover 44 are provided with axially opposite, tube-shaped projection 59, 60 which are closed at their inner ends. In the projections 59, 60, one Reed switch 61, 62 respectively is arranged. These switches 61, 62 are fixed in the projections 59, 60 in defined axial positions. This fixing may take place by a screwing-together, clipping-together or gluing-together, for example.

The floats 53, 54, which are arranged in the chambers 50, 52 with play and have a barrel-shaped contour, are guided on the tube-shaped projections 59, 60 of the bottom 41 and of the cover 44. The axial bore of the floats 53, 54 is provided with rounded guide ribs 63 which extend in the longitudinal direction and which are linearly guided on the projections 59, 60. The floats 53, 54 each carry a permanent magnet ring 64, 65 which is polarized in the axial direction and which interacts with the pertaining Reed switch 61, 62.

The lower Reed switch 61 and the permanent magnet ring 64 of the float 53 form a detector which responds when there is a falling-below the minimal filling with refrigerant. In this case, the Reed switch is closed. This has the advantage that, also in the case of a condenser which is not yet filled with the refrigerant, the operatability of the detector can be tested which is formed of the Reed switch 61 and the permanent magnet ring 64 because the permanent magnet ring 64 closes the Reed switch 61 in this position so that a positive signal is present. By means of this signal, it can be tested after the mounting whether the float 53 with the permanent magnet 64 was mounted correctly.

The Reed switch 62 and the permanent magnet ring 65 form a filling detector which responds when the maximal filling amount of refrigerant is reached during the filling. In this case also, it is provided that, in the condition in which no refrigerant has yet been filled in, the permanent magnet 65 holds the Reed switch 62 closed so that a positive signal is present. In this condition, the float 54 is disposed on the partition 49. Also in this case, it can then be tested whether the float 54 and the permanent magnet 65 are mounted correctly because the positive signal can be queried, specifically that the Reed switch 62 is closed. When the maximal filling amount is reached, the float 54 with the permanent magnet 65 moves so far upward that the Reed switch 62 is opened up which can be evaluated as the signal for terminating the filling operation.

The bottom 41 and the cover 44, which is provided with bores 66 for applying a face spanner, are manufactured, like the collector 19, from aluminum or an aluminum alloy, for example, by extrusion or cold extrusion. The tube-shaped projections 59, 60 are therefore made of a material which can virtually not be magnetized so that the signal transmission from the permanent magnet 64, 65 to the Reed switches 61, 62 is not disturbed.

Figure 4:
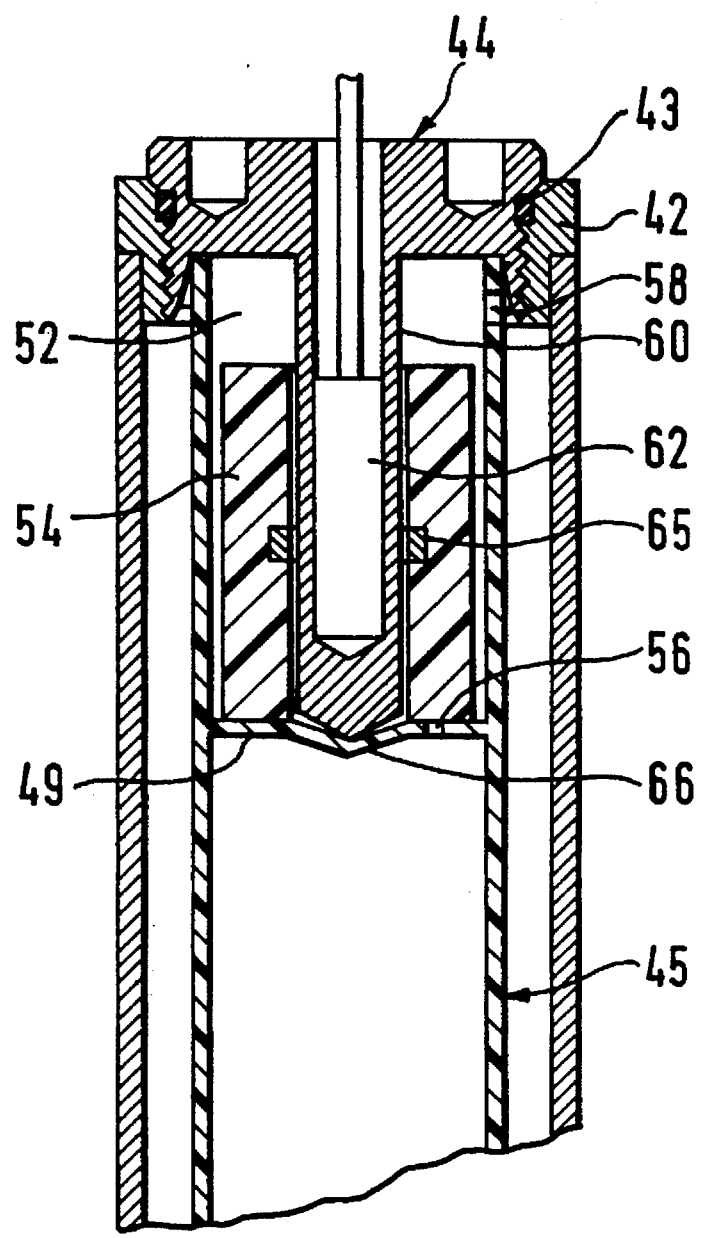
FIG. 4 is a partial sectional view of still another embodiment similar to FIG. 3.

In the embodiment according to FIG. 4, which in principle corresponds to the embodiment according to FIG. 3, the face walls 46, 47 existing there are eliminated. The cover 44 and the bottom, which is not shown, directly grip the open ends of the housing 45 in a centering manner. In addition, it is provided that the projection 60, which has a truncated-cone-shaped tip, is extended to the transverse wall 49. This transverse wall 49, which is slightly flexible in the axial direction of the housing 45, is provided with a corresponding conical indentation 66 so that the projection 60 engages in this indentation 66 of the transverse wall 49 in a centering manner. Likewise, the bottom, which is not shown here, may be designed with a pertaining projection so that the projection 60 and the opposite projection of the bottom center the whole housing 45.

In the embodiment according to FIG. 4, it is also provided that the axially polarized permanent magnet 65 is arranged in the axial center of the float 54 so that installation errors are avoided from the start.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A condenser for an air-conditioning system of a vehicle comprising:

a block of tubes and ribs that has collecting tubes on both sides of the block;

a tube-shaped collector arranged in parallel to one of said collecting tubes and forming a constructional unit together with said collecting tube, the collector having at least one wall;

at least one float arranged inside the collector, said float carrying a transmitter element; and a receiver element arranged on the outside on the collector, said receiver element receiving signals of the transmitter element through the wall of the collector.

2. A condenser according to claim 1, wherein two of said floats are arranged in the collector, with one of said floats being an upper float for a filling detector and the other of said floats being a lower float which is assigned for a detector which responds when there is a falling-below a minimal filling.

3. A condenser according to claim 2, wherein at least one of the lower and upper floats is arranged in a calm-flow area of the collector.

4. A condenser according to claim 1, further comprising a slideway in the collector, the at least one float being displaceably guided on the slideway.

5. A condenser according to claim 1, further comprising a swivel shaft about which the at least one float is swivellably disposed.

6. A condenser according to claim 1, further comprising a dryer having a housing inserted in the collector, the at least one float being arranged in said housing, the collector having an insertion opening, and a detachable cover by which the insertion opening is closable.

7. A condenser according to claim 6, wherein the housing has a chamber with defined inlet openings, the at least one float being arranged in said chamber of the housing.

8. A condenser according to claim 6, wherein the collector has a cover and a bottom and the receiver element is mounted on at least one of the cover and the bottom of the collector.

9. A condenser according to claim 8, wherein the cover and the bottom of the collector each has a tube-shaped projection which is closed on one side, which projection projects into the interior of the collector and in which one of the receiver elements is arranged.

10. A condenser according to claim 9, wherein the housing has at least one transverse wall with an indentation, wherein the projection of at least one of the cover and of the bottom engages in a centering manner in said indentation of the pertaining transverse wall.

11. A condenser according to claim 9, wherein the at least one float is guided on the projection of at least one of the bottom and of the cover.

12. A condenser according to claim 1, wherein the at least one float includes a permanent magnet serving as the transmitter element and the receiver element is at least one of a Hall effect element and a Reed switch, the receiver element being arranged on the exterior side of the collector.

13. A condenser according to claim 12, wherein the transmitter element and the receiver element are arranged in such a manner that when refrigerant is absent, a contact is closed.

14. A condenser according to claim 1, wherein said constructional unit includes a common end plate closing off one end of both said collector and said one of said collecting tubes.

15. A condenser according to claim 1, wherein said constructional unit includes a pair of common end plates closing off respective ends of both said collector and said one of said collecting tubes.

16. A condenser for an air-conditioning system of a vehicle comprising:

a block of tubes and ribs that has collecting tubes on both sides of the block;

a tube-shaped collector arranged in parallel to one of said collecting tubes, the collector having at least one wall;

two floats arranged inside the collector, each of said floats carrying a respective transmitter element; and receiver elements arranged on the outside of the collector to receive signals of the transmitter elements through the walls of the collector;

wherein one of said floats is an upper float for a filling detector and the other of said floats is a lower float which is assigned to a detector which responds when the fluid in the collector falls below a minimal filling level.

17. A condenser according to claim 16, wherein at least one of the lower and upper floats is arranged in a calm-flow area of the collector.

18. A condenser according to claim 16, wherein said one of said collecting tubes forms a unit with said collector.

19. A condenser for an air-conditioning system of a vehicle comprising:

a block of tubes and ribs that has collecting tubes on both sides of the block;

a tube-shaped collector arranged in parallel to one of said collecting tubes, the collector having at least one wall;

at least one float arranged inside the collector, said float carrying a transmitter element;

a receiver arranged on the outside of the collector to receive signals of the transmitter element through the wall of the collector; and a drier having a housing inserted in the collector, the at least one float being arranged in said housing, the collector having an insertion opening, and a detachable cover by which the insertion opening is closeable.

20. A condenser according to claim 19, wherein the housing has a chamber with defined inlet openings, the at least one float being arranged in said chamber of the housing.

21. A condenser according to claim 19, wherein the collector has a cover and a bottom and the receiver element is mounted on at least one of the cover and the bottom of the collector.

22. A condenser according to claim 21, wherein the cover and the bottom of the collector each has a tube-shaped projection which is closed on one side, which projection projects into the interior of the collector and in which one of the receiver elements is arranged.

23. A condenser according to claim 22, wherein the housing has at least one transverse wall with an indentation, wherein the projection of at least one of the cover and of the bottom engages in a centering manner in said indentation of the pertaining transverse wall.

24. A condenser according to claim 22, wherein the at least one float is guided on the projection of at least one of the bottom and of the cover.

25. A condenser according to claim 19, wherein said one of said collecting tubes forms a unit with said collector.

* * * * *